United States Patent Office 3,147,270
Patented Sept. 1, 1964

3,147,270
SUBSTITUTED 2-IMIDAZOLINES
Floyd E. Anderson, Morris Plains, N.J., assignor to Warner-Lambert Pharmaceutical Company, Morris Plains, N.J., a corporation of Delaware
No Drawing. Filed Nov. 3, 1961, Ser. No. 149,848
30 Claims. (Cl. 260—296)

The present invention relates to new and novel 2-imidazolines of the formula:

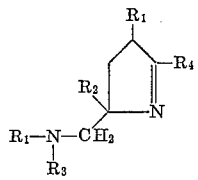

wherein $R_1$ is alkyl of 1 to 18 carbon atoms; $R_2$ is hydrogen or lower alkyl, $R_3$ is hydrogen or lower alkyl; and $R_4$ is a member of the group consisting of:

(a) alkyl of 1 to 20 carbon atoms;
(b) cycloalkyl of 5 to 10 carbon atoms containing 5 to 7 carbon atoms in the cycloalkyl ring, for example cyclopentyl, cyclohexyl, cycloheptyl, methylcyclopentyl, ethylcyclohexyl, ethylcycloheptyl, butylcyclohexyl and the like;
(c) alkyl of 1 to 20 carbon atoms substituted with lower alkoxy or phenoxy, for example 3-phenoxypropyl, 2-ethoxyethyl, 6-methoxyhexyl, 4-phenoxystearyl and the like;
(d) amino;
(e) heterocyclic members of the group consisting of

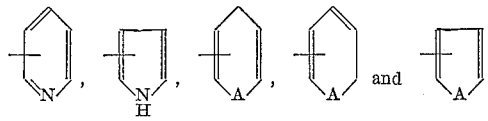

in which A is oxygen or sulfur;
(f) biphenylyl;
(g) diphenylmethyl;
(h) substituents having the formula

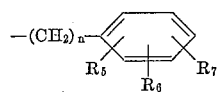

in which $n$ is 0 to 2 and $R_5$, $R_6$ and $R_7$ are hydrogen, halogen, hydroxyl, lower alkyl, lower alkoxy or nitro, for example phenyl, phenethyl, benzyl, p-chlorophenyl, p-bromophenyl, p-fluorophenyl, p-bromobenzyl, p-tolyl, m-tolyl, o-tolyl, p-methoxyphenyl, p-methoxybenzyl, 3,4 - dimethoxyphenyl, 3,4 - dimethoxybenzyl, 3,4,5 - trimethoxyphenyl, 3,4 - dichlorophenyl, 3,4 - dibromobenzyl, 3,4,5 - trichlorophenyl, 3,4,5 - trichlorobenzyl, p-hydroxyphenyl, 3,4-dihydroxyphenyl, 3,4,5-trihydroxyphenyl, p-hydroxyphenethyl, p-nitrophenyl, p-nitrobenzyl, 3,4 - dinitrophenyl, 2,4,6 - trinitrophenyl and the like; and
(i) substituents having the formula

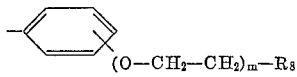

in which $m$ is 1 to 4 and $R_8$ is lower alkoxy.

This invention also relates to the pharmaceutically acceptable non-toxic acid addition salts of these compounds.

The compounds of the present invention are effective antimicrobial agents against bacteria, fungi and protozoa, for example such organisms as *S. aureus*, *E. coli*, *S. schenkii*, *T. vaginalis* and the like, and maintain significant antimicrobial effectiveness even in the presence of serum.

It has now been found that those compounds of this invention having the formula:

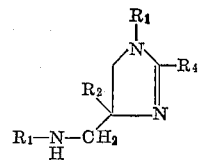

wherein $R_1$, $R_2$ and $R_4$ are as described hereinabove may be prepared by the following reaction:

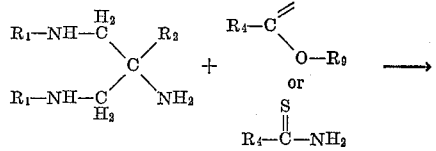

wherein $R_9$ is lower alkyl.

Where an imidate ester hydrochloride reactant of the formula

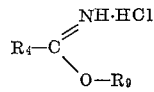

is employed, the reaction is normally carried out by refluxing the reactants in an anhydrous solvent system, for example methanol or ethanol. The reaction mixture is then evaporated to dryness, the residue extracted with a solvent such as ether and the product recovered from the extract by distillation.

Where a thioamide reactant of the formula

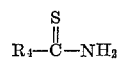

is employed, the reaction is carried out by heating the reactants to a temperature between about 100° C. and 200° C., normally in the absence of solvent. The reaction mixture is then extracted with a solvent such as ether and the product recovered from the extract by distillation.

The triamine starting materials of the formula:

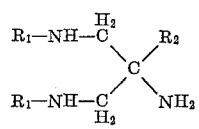

are known compounds described in U.S. Patent 2,436,779.

The imidate ester hydrochlorides of the formula:

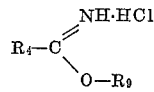

may be readily prepared by the reaction of a nitrile with an alcohol in the presence of hydrogen chloride, as follows:

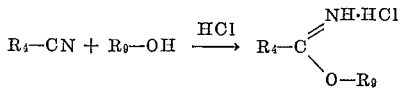

Dry hydrogen chloride is passed through a chilled mixture of the nitrile and the alcohol at a temperature of about 0° C. The imidate ester hydrochloride which precipitates from the reaction mixture is recoverable therefrom by filtration.

The thioamide reactants of the formula

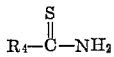

are known compounds and may be prepared by well known chemical procedures.

The new and novel substituted 2-imidazolines of this invention of the formula:

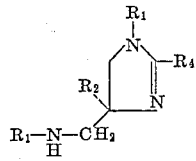

may be converted to their N-lower alkyl derivatives of the formula:

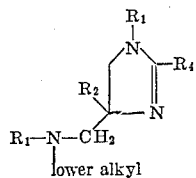

by conventional reductive alkylation techniques, for example, treatment with an aldehyde or ketone in the presence of hydrogen and a hydrogenation catalyst such as platinum, palladium and the like. Where the lower alkyl substituent on the nitrogen atom is a methyl group, treatment with a mixture of formaldehyde and formic acid according to the well known Eschweiler-Clark alkylation procedure may be employed.

The substituted 2-imidazolines of this invention may be converted into their pharmaceutically acceptable non-toxic acid addition salts by conventional techniques of salt formation. Useful acids for the preparation of such salts include hydrochloric acid, sulfuric acid, oxalic acid, maleic acid, tartaric acid, citric acid, ascorbic acid, phosphoric acid, salicyclic acid, malic acid, lactic acid, benzoic acid, acetic acid and the like.

The 2-imidazolines of this invention, including their pharmaceutically acceptable non-toxic acid addition salts, may be formulated with conventional pharmaceutical carriers to form useful bactericidal compositions. Such carriers may be liquid, to form solutions or suspensions, solids, to form powders and tablets, or semi-solid materials, to form pastes, ointments and the like.

The following examples are included in order further to illustrate the present invention (all refractive indices are taken at 25° C.):

EXAMPLE 1

*1-(2-Ethylhexyl)-4-[(2-Ethylhexyl)Aminomethyl]-2,4-Dimethyl-2-Imidazoline*

A mixture of 16.4 grams (0.05 mol) of 2-methyl-2-amino-1,3-propanebis(2-ethylhexylamine) and 7.5 grams (0.1 mol) of thioacetamide is heated on a steam bath for 6 hours. An additional quantity of 3.0 grams of thioacetamide is added and the mixture is heated for 24 hours on a steam bath.

The reaction mixture is then dissolved in ether and the solution is washed three times with 50 ml. portions of water, four times with 50 ml. portions of 5% sodium carbonate solution and finally with water. The washed ethereal solution is dried over magnesium sulfate and heated to evaporate the ether.

The oil is distilled at 0.7 mm. of mercury and the fraction coming over at a vapor temperature of 160–162° C. is collected and redistilled at 0.1 mm. of mercury. The fraction coming over at 148° C., refractive index=1.4675, constituted 1-(2-ethylhexyl)-4-[(2-ethylhexyl)aminomethyl]-2,4-dimethyl-2-imidazoline.

*Analysis.*—Calc.: C, 75.15; H, 12.90; N, 11.95. Found: C, 74.96; H, 13.10; N, 11.76.

EXAMPLE 2

*1-(2-Ethylhexyl)-4-{[(2-Ethylhexyl)Methylamino]-Methyl}-2,4-Dimethyl-2-Imidazoline*

A mixture of 5 g. 1-(2-ethylhexyl)-4-[(2-ethylhexyl)-aminomethyl]-2,4-dimethyl-2-imidazoline prepared as described in Example 1, 69 g. formaldehyde (37% aqueous solution) and 18 g. formic acid (90% aqueous solution) is refluxed for 6.5 hours. The excess formaldehyde and formic acid are removed by distillation under reduced pressure and the residue is made basic with 5 N NaOH. The mixture is extracted with ether, the extract is washed with water and then dried over sodium sulfate and the ether removed by distillation. The resuling oil is distilled at 0.1 mm. of mercury. The fraction coming over at a vapor temperature of 173–175° C., refractive index=1.4697, constitutes 1-(2-ethylhexyl)-4-{[(2-ethylhexyl)methylamino]methyl}-2,4-dimethyl-2-imidazoline.

*Analysis.*—Calc.: C, 75.55; H, 12.96; N, 11.49. Found: C, 75.43; H, 12.76; N, 11.59.

EXAMPLE 3

*1-(2-Ethylhexyl)-4-[(2-Ethylhexyl)Aminomethyl]-4-Methyl-2-Tridecyl-2-Imidazoline*

By a procedure similar to that described in Example 1, 2-methyl-2-amino-1,3-propanebis(2-ethylhexylamine) is reacted with thiomyristamide and the product is recovered from the reaction mixture. The oil remaining after evaporation of the ether is distilled at 0.05 mm. of mercury and the fraction coming over at a vapor temperature of 190 to 200° C. is collected and redistilled at 0.02 mm. of mercury. The fraction coming over at a vapor temperature of 198–199° C., refractive index=1.4672, constitutes 1-(2-ethylhexyl)-4-[(2-ethylhexyl)aminomethyl]-4-methyl-2-tridecyl-2-imidazoline.

*Analysis.*—Calc.: C, 78.54; H, 13.38; N, 8.08. Found: C, 78.76; H, 13.27; N, 8.26.

EXAMPLE 4

*1-(2-Ethylhexyl)-4-[(Ethylhexyl)Aminomethyl]-4-Methyl-2-(3-Phenoxypropyl)-2-Imidazoline*

48.8 g. (0.2 mol) ethyl 2-(2-phenoxyethyl)acetimidate hydrochloride are added to a solution of 75.6 g. (0.23 mol) 2-methyl-2-amino-1,3-propanebis(2-ethylhexylamine) in 300 ml. absolute ethanol and the mixture is refluxed for 23 hours. The ethanol is removed by distillation, water is added and the mixture is made basic with 200 ml. 10% NaOH. The resulting mixture is extracted with 700 ml. ether and the ethereal extract is washed with three 200 ml. portions of water and dried over magnesium sulfate.

The ether is removed by distillation and the oil is distilled at 0.02 mm. of mercury. The fraction coming over at a vapor temperature of 213–216° C. is redistilled at 0.02 mm. of mercury. The fraction coming over at a vapor temperature of 217–219° C., refractive index=1.4959, constitutes 1-(2-ethylhexyl)-4-[(2-ethylhexyl)aminomethyl]-4-methyl-2-(3-phenoxypropyl)-2-imidazoline.

*Analysis.*—Calc.: C, 76.38; H, 11.32; N, 8.91. Found: C, 76.11; H, 11.44; N, 8.98.

EXAMPLE 5

*2-Amino-1-(2-Ethylhexyl)-4-[(2-Ethylhexyl)Aminomethyl]-4-Methyl-2-Imidazoline*

A mixture of 16.4 grams (0.05 mol) of 2-methyl-2-amino-1,3-propanebis(2-ethylhexylamine) and 7.6 grams (0.1 mol) of thiourea is heated at 180–184° C. for 8 hours. The resulting waxy mixture is dissolved in 500 ml. ether and 200 ml. 1 N NaOH. The ethereal layer is separated, washed with water and dried over magnesium sulfate.

To the dried ethereal solution is added ethereal HCl. The precipitated yellowish colored solid is washed with ether and recrystallized twice from a mixture of isopropanol and ethyl acetate. The resulting white crystals, melting point=228–230° C., constitute the dihydrochloride salt of 2-amino-1-(2-ethylhexyl)-4-[(2-ethylhexyl)aminomethyl]-4-methyl-2-imidazoline.

*Analysis.*—Calc.: C, 59.28; H, 10.90; Cl, 16.66. Found: C, 59.56; H, 10.69; Cl, 16.50.

EXAMPLE 6

*1-(2-Ethylhexyl)-4-[(2-Ethylhexyl)Aminomethyl]-4-Methyl-2-(4-Pyridyl)-2-Imidazoline*

A mixture of 12.9 grams of thioisonicotinamide and 32.8 grams of 2-methyl-2-amino-1,3-propanebis(2-ethylhexylamine) is heated at 170–175° C. for 10 hours. The mixture is taken up with ether, filtered and the filtrate made alkaline with 1 N NaOH. The ethereal layer is washed with water, dried over magnesium sulfate and heated to evaporate ether.

The residue is dissolved in a minimum amount of ether. An ethereal solution of oxalic acid is added and the precipitated oxalate salt is recovered by filtration. The crystals are dissolved in a mixture of 4 liters of methanol, 500 ml. of isopropanol and 150 ml. of water. The solution is decolorized with charcoal and allowed to crystallize at room temperature. The crystals are recovered by filtration.

The filtrate is evaporated to one-half its volume and the precipitate is recovered and combined with the previously obtained crystals. The combined solids are treated with sodium hydroxide and the mixture extracted with ether. The extract is dried over magnesium sulfate and heated to evaporate ether.

The resulting oil is distilled at 0.8 mm. of mercury and the fraction coming over at a vapor temperature of 163–190° C. is collected and redistilled at 0.7 mm. of mercury. The fraction coming over at a vapor temperature of 193–196° C., refractive index=1.4999, is 1-(2-ethylhexyl) - 4 - [(2 - ethylhexyl)aminomethyl] - 4 - methyl - 2-(4-pyridyl)-2-imidazoline.

*Analysis.*—Calc.: C, 75.31; H, 11.18; N, 13.51. Found: C, 75.11, H, 11.30; N, 13.69.

EXAMPLE 7

*1-(2-Ethylhexyl)-4-[(2-Ethylhexyl)Aminomethyl]-4-Methyl-2-(2-Furyl)-2-Imidazoline*

23.8 g. (0.135 mol) ethyl 2-furoimidate hydrochloride is added to a solution of 44.2 g. (0.135 mol) 2-methyl-2-amino-1,3-propanebis(2-ethylhexylamine) in 110 ml. absolute ethanol and the mixture is refluxed for 6.5 hours. The ethanol is evaporated and the resulting oil is distilled at 1.0 mm. of mercury. The fraction coming over a vapor temperature of 182–195° C. is collected and redistilled at 0.1 mm. of mercury. The fraction coming over at 178–180° C., refractive index=1.4900, constitutes 1-(2-ethylhexyl) - 4 - [(2 - ethylhexyl)aminomethyl] - 4-methyl-2-(2-furyl)-2-imidazoline.

*Analysis.*—Calc.: C, 74.39; H, 11.24; N, 10.41. Found: C, 74.46; H, 11.54; N, 10.47.

EXAMPLE 8

*1-(2-Ethylhexyl)-4-[(2-Ethylhexyl)Aminomethyl]-4-Methyl-2-Phenyl-2-Imidazoline*

Ethyl benzoimidate hydrochloride and 2-methyl-2-amino-1,3-propanebis(2-ethylhexylamine) are reacted and the reaction mixture is processed as described in Example 4. The oil remaining after evaporation of the ether is distilled at 1.5 mm. of mercury. The fraction coming over at a vapor temperature of 175–190° C. is collected and redistilled at 0.07 mm. of mercury. The fraction coming over at 175–177° C., refractive index=1.4954, constitutes 1-(2-ethylhexyl)-4-[(2-ethylhexyl)aminomethyl]-4-methyl-2-phenyl-2-imidazoline.

*Analysis.*—Calc.: C, 78.39; H, 11.45; N, 10.16. Found: C, 78.56; H, 11.71; N, 10.12.

EXAMPLE 9

*1-(2-Ethylhexyl)-4-[(2-Ethylhexyl)Aminomethyl]-4-Methyl-2-(p-Tolyl)-2-Imidazoline*

Ethyl p-toluimidate hydrochloride and 2-methyl-2-amino-1,3-propanebis(2-ethylhexylamine) are reacted and the product recovered from the reaction mixture as described in Example 4. The oil remaining after removal of the ether is distilled at a pressure of 0.8 mm. of mercury. The fraction coming over at a vapor temperature of 190–209° C. is collected and redistilled at 0.4 mm. of mercury. The fraction coming over at a vapor temperature of 197–199° C., refractive index=1.4999, constitutes 1-(2-ethylhexyl)-4-[(2-ethylhexyl)aminomethyl]-4-methyl-2-(p-tolyl)-2-imidazoline.

*Analysis.*—Calc.: C, 78.63; H, 11.55; N, 9.83. Found: C, 78.39; H, 11.52; N, 9.89.

Treatment of an ether solution of the 2-imidazoline prepared as described above with an ethereal solution of oxalic acid followed by recrystallization of the precipitate from aqueous methanol-isopropanol yields the dioxalate salt, melting point 94–96° C.

*Analysis (of the dioxalate).*—Calc.: C, 63.23; H, 8.79; N, 6.91. Found: C, 63.11; H, 8.78; N, 6.76.

EXAMPLE 10

*1-(Sec-Butyl)-4-[(Sec-Butyl)Aminomethyl]-4-Methyl-2-(p-Tolyl)-2-Imidazoline*

Ethyl p-toluimidate hydrochloride and 2 - methyl-2-amino-1,3-propanebis (sec-butylamine) are reacted and the product recovered from the reaction mixture as described in Example 4. The oil is distilled at 2.0 mm. of mercury and the fraction coming over at a vapor temperature of 160–165° C. is redistilled at 2.0 mm. of mercury. The fraction coming over at 170–172 C., refractive index=1.5138, constitutes 1-(sec-butyl)-4-[(sec-butyl)aminomethyl]-4-methyl-2-(p-tolyl)-2-imidazoline.

*Analysis.*—Calcl.: C, 76.14; H, 10.54; N, 13.32. Found: C, 76.38; H, 10.48; N, 13.07.

EXAMPLE 11

*1-(2-Ethylhexyl)-4-{[(2-Ethylhexyl)Methylamino]-Methyl}-4-Methyl-2-(p-Tolyl)-2-Imidazoline*

1 - (2 - ethylhexyl)-4-[(2-ethylhexyl)aminomethyl]-4-methyl-2-(p-tolyl)-2-imidazoline prepared as described in Example 9 is reacted with formic acid and formaldehyde and the reaction mixture is processed by the procedure set forth in Example 2. The oil is distilled at 0.05 mm. of mercury and the fraction coming over at a vapor temperature of 177–178° C., refractive index=1.49995, constitutes 1-(2-ethylhexyl)-4-{[2-ethylhexyl)methlamino]methyl} - 4-methyl-2-(p-tolyl)-2-imidazoline.

*Analysis.*—Calc.: C, 78.85; H, 11.64; N, 9.51. Found: C, 78.57; H, 11.42; N, 9.65.

EXAMPLE 12

*1-(2-Ethylhexyl)-4-[(2-Ethylhexyl)Aminomethyl]-4-Methyl-2-(m-Tolyl)-2-Imidazoline*

Ethyl m-toluimidate hydrochloride and 2 - methyl-2-amino-1,3-propanebis (2-ethylhexylamine) are reacted and the product is recovered from the reaction mixture by the procedure set forth in Example 4. The oil is distilled at 0.05 mm. of mercury and the fraction coming over at a vapor temperature of 170–197° C. is redistilled at 0.10 mm. of mercury. The fraction coming over at 193–195° C., refractive index=1.4980, constitutes 1-(2-ethylhexyl) - 4-[(2 - ethylhexylaminomethyl]-4-methyl-2-(m-tolyl)-2-imidazoline.

*Analysis.*—Calc.: C, 78.63; H, 11.55; N, 9.83. Found: C, 78.33; H, 11.39; N, 9.88.

EXAMPLE 13

*1-(2-Ethylhexyl)-4-[(2-Ethylhexyl)Aminomethyl]-4-Methyl-2-(p-Chlorophenyl)-2-Imidazoline*

Ethyl p-chlorobenzoimidate hydrochloride and 2-methyl-2-amino-1,3-propanebis (2-ethylhexylamine) are reacted and the product is recovered from the reaction mixture by the procedure set forth in Example 4. The oil is distilled at 0.4 mm. of mercury and the fraction coming over at a vapor temperature of 195–204° C. is collected and redistilled at 0.4 mm. of mercury. The fraction coming over at 205–208° C., refractive index=1.5070, constitutes 1 - (2 - ethylhexyl)-4-[(2-ethylhexyl)aminomethyl]-4-methyl-2-(p-chlorophenyl)-2-imidazoline.

*Analysis.*—Calc.: C, 72.36; H, 10.35; Cl, 7.91. Found: C, 71.59; H, 10.32; Cl, 8.13.

EXAMPLE 14

*1-(2-Ethylhexyl)-4-[(2-Ethylhexyl)Aminomethyl]-4-Methyl-2-(3,4-Dimethoxyphenyl)-2-Imidazoline*

Ethyl 3,4-dimethoxybenzoimidate hydrochloride and 2-methyl-2-amino-1,3-propanebis (2-ethylhexylamine) are reacted and the product is recovered from the reaction mixture by the procedure of Example 4. The oil is distilled at 0.07 mm. of mercury and the fraction coming over at a vapor temperature of 190–209° C. is redistilled at 0.05 mm. of mercury. The fraction coming over at 206–208° C., refractive index=1.5103, constitutes 1-(2-ethylhexyl) - 4-[(2 - ethylhexyl)aminomethyl]-4-methyl-2-(3,4-dimethoxyphenyl)-2-imidazoline.

*Analysis.*—Calc.: C, 73.52; H, 10.85; N, 8.87. Found: C, 74.05; H, 10.83; N, 8.74.

EXAMPLE 15

*1-(2-Ethylhexyl)-4-[(2-Ethylhexyl)Aminomethyl]-4-Methyl-2-Benzyl-2-Imidazoline*

Ethyl 2-phenylacetimidate hydrochloride and 2-methyl-2-amino-1,3-propanebis (2-ethylhexylamine) are reacted and the product recovered from the reaction mixture as described in Example 4. The resulting oil is distilled at 0.7 mm. of mercury and the fraction coming over at 190°–205° C. is collected and redistilled at 0.5 mm. of mercury. The fraction coming over at a vapor temperature 198°–200° C., refractive index=1.4955, constitutes 1 - (2 - ethylhexyl)-4-[(2-ethylhexyl)aminomethyl]-4-methyl-2-benzyl-2-imidazoline.

*Analysis.*—Calc.: C, 78.63; H, 11.55; H, 9.82. Found: C, 78.07; H, 11.67; N, 10.02.

EXAMPLE 16

*1-(2-Ethylhexyl)-4-[(2-Ethylhexyl)Aminomethyl]-4-Methyl-2-(p-Bromobenzyl)-2-Imidazoline*

A mixture of 32.8 grams (0.1 mol) of 2-methyl-2-amino-1,3-propanebis(2-ethylhexylamine) and 30.5 grams (0.113 ml) of ethyl 2-(p-bromophenyl) acetimidate hydrochloride in 200 ml. of absoulte ethanol is refluxed for 6 hours and allowed to stand overnight. The solvent is evaporated under vacuum and to the yellowish oil is added 250 ml. absolute ether. The percipitate is discarded and the etheral solution is washed with water and 5% sodium bicarbonate solution. The washed ethereal solution is dried over magnesium sulfate and heated to evaporate the ether.

The resulting oil is distilled under reduced pressure. The fraction coming over at a vapor temperature of 190–224° C., pressure=0.5 mm. of mercury, is collected and redistilled at 0.5 mm. of mercury pressure. The fraction coming over at a vapor temperature of 210–228° C., refractive index=1.5103, constitutes 1-(2-ethylhexyl)-4[(2 - ethylhexyl)aminomethyl]-4 - methyl-2-(p-bromobenzyl)-2-imidazoline.

*Analysis.*—Calc.: C, 66.38; H, 9.55; Br, 15.78; Found: C, 66.24; H, 9.74; Br, 15.74.

To an acetone solution of the 2-imidazoline prepared as described above an ethanol solution of anhydrous oxalic acid is added. The precipitate formed after the addition of ether is separated by filtration, washed with ether and recrystallized from aqueous isopropanol to yield the dioxalate salt as a mono-hydrate, melting point 131–134° C.

*Analysis (of the dioxalate monohydrate).*—Calc.: C, 54.54; H, 7.72; N, 5.96; Br, 11.34. Found: C, 54.48; H, 8.15; N, 6.36; Br, 11.54.

EXAMPLE 17

*1-(2-Ethylhexyl)-4-[(2-Ethylhexyl)Aminomethyl]-4-Methyl-2-(p-Methoxybenzyl)-2-Imidazoline*

Ethyl 2-(p-methoxyphenyl)acetimidate hydrochloride and 2-methyl-2-amino-1,3-propanebis(2-ethylhexylamine) are reacted and the product is recovered from the reaction mixture by the procedure set forth in Example 4. The oil is distilled at 0.1 mm. of mercury. The fraction coming over at a vapor temperature of 200–206° C. is collected and redistilled at 0.1 mm. of mercury. The fraction coming over at a vapor temperature of 203–206° C., refractive index=1.4998, constitutes 1-(2-ethylhexyl)-4-[(2-ethylhexyl)aminomethyl]-4-methyl - 2 - (p-methoxybenzyl)-2-imidazoline.

*Analysis.*—Calc.: C, 76.09; H, 11.23; N, 9.18. Found: C, 75.90; H, 11.25; N, 8.90.

EXAMPLE 18

*1-(2-Ethylhexyl)-4-[(2-Ethylhexyl)Aminomethyl]-4-Methyl-2-(3,4-Dimethoxybenzyl)-2-Imidazoline*

Ethyl 2-(3,4-dimethoxyphenyl)acetimidate hydrochloride and 2-methyl-2-amino-1,3-propanebis(2-ethylhexylamine) are reacted and the product is recovered from the reaction mixture as described in Example 4. The oil is distilled at 0.5 mm. of mercury. The fraction coming over at a vapor temperature of 174–220° C. is redistilled at 0.08 mm. of mercury. The fraction coming over at 214–217° C., refractive index=1.5055, constitutes 1-(2-ethylhexyl)-4-[(2-ethylhexyl)aminomethyl] - 4-methyl-2-(3,4-dimethoxybenzyl)-2-imidazoline.

*Analysis.*—Calc.: C, 73.87; H, 10.95; N, 8.62. Found: C, 73.99; H, 10.84; N, 8.91.

EXAMPLE 19

*1-(2-Ethylhexyl)-4-[(2-Ethylhexyl)Aminomethyl]-4-Methyl-2-(p-Hydroxyphenyl)-2-Imidazoline*

Ethyl p-hydroxybenzoimidate hydrochloride and 2-methyl-2-amino-1,3-propanebis(2 - ethylhexylamine) are reacted by the procedure of Example 4. The ethanol solvent is separated by distillation, water is added and the residue is treated with aqueous sodium bicarbonate to a pH of about 8. The mixture is extracted with ether and the extract is washed with water and dried over magnesium sulfate.

The dried extract is distilled to remove the ether and the oil is distilled at 0.10 mm. of mercury. The fraction coming over at a vapor temperature of 260–264° C. constitutes the crude product as a yellowish, very viscous oil.

10 g. (0.023 mol) of this oil are dissolved in 300 ml. anhydrous ether and to the resulting solution is added an anhydrous solution of 5.5 g. (0.061 mol) oxalic acid in 150 ml. ether. The precipitate is separated, washed with ether and recrystallized once from absolute ethanol-anhydrous ether and twice from ethanol-ether-acetonitrile to yield 12.8 g. of the dioxalate salt of 1-(2-ethylhexyl)-4-[(2-ethylhexyl)aminomethyl] - 4 - methyl-2-(p-hydroxyphenyl)-2-imidazoline, M.P. 100–104° C.

The free base is obtained by treating the dioxalate salt with aqueous sodium bicarbonate solution followed by extraction with ether. The extract is washed with water, dried over magnesium sulfate and distilled.

The fraction coming over a vapor temperature of 236–238° C., 0.1 mm. of mercury constitutes the product.
Analysis.—Calc.: C, 75.47; H, 11.03; N, 9.78. Found: C, 75.28; H, 11.13; N, 9.73.

EXAMPLE 20

*1-(2-Ethylhexyl)-4-[(2-Ethylhexyl)Aminomethyl]-4-Methyl-2-(p-Methoxyphenyl)-2-Imidazoline*

Ethyl p-methoxybenzoimidate hydrochloride and 2-methyl-2-amino-1,3-probanebis(2 - ethylhexylamine) are reacted and the product is recovered from the reaction mixture as described in Example 4. The oil is distilled at 0.02 mm. of mercury. The fraction coming over at a vapor temperature of 209–210° C., refractive index= 1.5058, constitutes 1-(2-ethylhexyl)-4-[(2-ethylhexyl)aminomethyl]-4-methyl - 2 - (p - methoxyphenyl)-2-imidazoline.
Analysis.—Calc.: C, 75.79; H, 11.13; N, 9.47. Found: C, 75.70; H, 11.40; N, 9.65.

EXAMPLE 21

*1-(2-Ethylhexyl)-4-[(2-Ethylhexyl)Aminomethyl]-4-Methyl-2-(p-Hexyloxyphenyl)-2-Imidazoline*

Ethyl p-hexyloxybenzoimidate hydrochloride and 2-methyl-2-amino-1,3-propanebis(2 - ethylhexylamine) are reacted and the reaction mixture is processed as described in Example 4. The oil is distilled at 0.1 mm. of mercury, the fraction coming over at a vapor temperature of 230–231° C., refractive index=1.5016, constituting 1-(2-ethylhexyl)-4-[(2-ethylhexyl)aminomethyl] - 4 - methyl-2-(p-hexyloxyphenyl)-2-imidazoline.
Analysis.—Calc.: C, 77.13; H, 11.57; N, 8.18. Found: C, 76.95; H, 11.79; N, 8.39.

EXAMPLE 22

*1-(2-Ethylhexyl)-4-[(2-Ethylhexyl)Aminomethyl]-4-Methyl-2-(p-Bromophenyl)-2-Imidazoline*

Ethyl p-bromobenzoimidate hydrochloride and 2-methyl-2-amino-1,3-probanebis(2-ethylhexylamine) are reacted and the reaction mixture is processed as described in Example 4. The oil is distilled at 0.08 mm. of mercury, the fraction coming over at a vapor temperature of 205–206° C., refractive index=1.5150, constituting 1-(2-ethylhexyl)-4-[(2-ethylhexyl)aminomethyl] - 4 - methyl-2-(p-bromophenyl)-2-imidazoline.
Analysis.—Calc.: C, 65.83; H, 9.41; N, 8.53. Found: C, 65.66; H, 9.63; N, 8.28.

EXAMPLE 23

*1-(2-Ethylhexyl)-4-[(2-Ethylhexyl)Aminomethyl]-4-Methyl-2-(p-Fluorophenyl)-2-Imidazoline*

Ethyl p-fluorobenzoimidate hydrochloride and 2-methyl-2-amino-1,3-probanebis(2-ethylhexylamine) are reacted and the reaction mixture is processed as described in Example 4. The oil is distilled at 0.08 mm. of mercury, the fraction coming over at a vapor temperature of 185–186° C., refractive index=1.4921, constituting 1-(2-ethylhexyl)-4-[(2-ethylhexyl)aminomethyl]-4-methyl - 2 - (p-fluorophenyl)-2-imidazoline.
Analysis.—Calc.: C, 75.12; H, 10.74; N, 9.74. Found: C, 75.19; H, 11.01; N, 9.95.

EXAMPLE 24

*1-(2-Ethylhexyl)-4-[(2-Ethylhexyl)Aminomethyl]-4-Methyl-2-(3,4-Dichlorophenyl)-2-Imidazoline*

Ethyl 3,4-dichlorobenzoimidate hydrochloride and 2-methyl-2-amino-1,3 - propanebis(2 - ethylhexylamine) are reacted and the reaction mixture is processed as described in Example 4. The oil is distilled at 0.07 mm. of mercury, the fraction coming over at a vapor temperature of 206–207° C., refractive index=1.5160, constituting 1-(2-ethylhexyl) - 4 - [(2-ethylhexyl)aminomethyl]-4-methyl-2-(3,4-dichlorophenyl)-2-imidazoline.

Analysis.—Calc.: C, 67.20; H, 9.40; N, 8.71. Found: C, 67.18; H, 9.37; N, 8.60.

EXAMPLE 25

*1 - (2 - Ethylhexyl) - 4 - [(2-Ethylhexyl)Aminomethyl]-4 - Methyl - 2 - [p - (Methoxytriethoxy)Phenyl] - 2-Imidazoline*

Ethyl p-methoxytriethoxybenzoimidate hydrochloride and 2-methyl-2-amino-1,3-propanebis(2-ethylhexylamine) are reacted and the reaction mixture is processed as described in Example 4. The oil is distilled at 0.03 mm. of mercury, the fraction coming over at a vapor temperature of 246° C., refractive index=1.5012, constituting 1 - (2 - ethylhexyl) - 4 - [(2-ethylhexyl)aminomethyl]-4-methyl - 2 - [p-(methoxytriethoxy)phenyl]-2-imidazoline. The substituent at the 2 position of the imidazoline ring is a radical of the formula

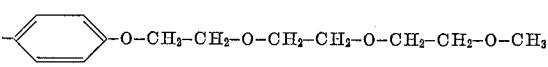

Analysis.—Calc.: C, 70.91; H, 10.68; N, 7.30. Found: C, 70.69; H, 10.82; N, 7.14.

EXAMPLE 26

*1-(2-Ethylhexyl)-4-[(2-Ethylhexyl)Aminomethyl]-4-Methyl-2-(p-Biphenylyl)-2-Imidazoline*

Ethyl p-phenylbenzoimidate hydrochloride and 2-methyl-2-amino-1,3-propanebis(2-ethylhexylamine) are reacted and the reaction mixture is processed as described in Example 4. The oil is distilled at 0.1 mm. of mercury, the fraction coming over at a vapor temperature of 219–220° C., refractive index=1.5395, constituting 1-(2-ethylhexyl) - 4 - [(2-ethylhexyl)aminomethyl]-4-methyl-2-(p-biphenylyl)-2-imidazoline.
Analysis.—Calc.: C, 80.92; H, 10.50; N, 8.58. Found: C, 81.35; H, 10.69; N, 8.22.

EXAMPLE 27

*1-(2-Ethylhexyl)-4-[(2-Ethylhexyl)Aminomethyl]-4-Methyl-2-Diphenylmethyl-2-Imidazoline*

Ethyl diphenylacetimidate hydrochloride and 2-methyl-2-amino-1,3-propanebis(2-ethylhexylamine) are reacted and the reaction mixture is processed as described in Example 4. The oil is distilled at 0.02 mm. of mercury, the fraction coming over at a vapor temperature of 213–214° C., refractive index=1.5188, constituting 1-(2-ethylhexyl) - 4-[(2-ethylhexyl)aminomethyl]-4-methyl-2-diphenylmethyl-2-imidazoline.
Analysis.—Calc.: C, 81.05; H, 10.60; N, 8.34. Found: C, 81.37; H, 10.79; N, 8.46.

EXAMPLE 28

*1-(2-Ethylhexyl)-4-[(2-Ethylhexyl)Aminomethyl]-4-Methyl-2-(p-Nitrobenzyl)-2-Imidazoline*

A solution of ethyl p-nitrophenylacetimidate hydrochloride (24.5 g.) and 32.8 g. 2-methyl-2-amino-1,3-propanebis(2-ethylhexylamine) in 200 ml. absolute ethanol is refluxed for 4 hours. The alcohol is removed by distillation under vacuum, water is added and the mixture is made basic with 150 ml. 10% sodium hydroxide. The mixture is extracted with benzene, the extract is filtered and the filtrate is washed with water and dried over magnesium sulfate.

The benzene is evaporated and the crude dark-red oil is distilled at 0.5 mm. of mercury. All material coming over at vapor temperatures up to 200° C. is discarded.

A quantity of 35 g. of distillation residue is dissolved in 400 ml. anhydrous ether. To this solution is added a solution of 19.3 g. oxalic acid in 300 ml. anhydrous ether. The precipitate is recovered, washed with ether and dissolved in a mixture of 800 ml. ethanol (95%)–500 ml. methanol–70 ml. water. The solution is decolorized with charcoal, filtered hot and allowed to stand at room temperature.

The precipitate is recovered and dried over $P_2O_5$. The filtrate is concentrated, cooled and the solids recovered and dried. The solids are combined, dissolved in ethanol, decolorized with charcoal and filtered hot. 10 volumes of ether are added to the filtrate, the precipitate is recovered and is recrystallized twice from 100 ml. absolute ethanol —1500 ml. anhydrous ether. The product, weight=8.3 g., M.P.=118–120° C., constitutes the dioxalate salt of 1-(2-ethylhexyl)-4-[(2-ethylhexyl)aminomethyl]-4-methyl-2-(p-nitrobenzyl)-2-imidazoline.

*Analysis.*—Calc.: C, 58.88; H, 8.03; N, 8.58. Found: C, 58.70; H, 8.26; N, 8.30.

EXAMPLE 29

*1-(2-Ethylhexyl)-4-[(2-Ethylhexyl)Aminomethyl]-4-Methyl-2-Phenethyl-2-Imidazoline*

Ethyl benzylacetimidate hydrochloride and 2-methyl-2-amino-1,3-propanebis(2-ethylhexylamine) are reacted and the reaction mixture is processed as described in Example 4. The oil is distilled at 0.05 mm. of mercury. The fraction coming over at a vapor temperature of 185–200° C. is collected and redistilled at 0.1 mm. of mercury. The fraction coming over at a vapor temperature of 202–204° C., refractive index=1.4947, constitutes 1-(2-ethylhexyl) - 4 - [(2 - ethylhexyl)aminomethyl]-4-methyl-2-phenethyl-2-imidazoline.

*Analysis.*—Calc.: C, 78.85; H, 11.64; N, 9.51. Found: C, 78.61; H, 11.89; N, 9.73.

This application is a continuation-in-part of my application Serial No. 77,831, filed December 23, 1960, now abandoned.

It is understood that the foregoing detailed description is given merely by way of illustration and that many variations may be made therein without departing from the spirit of my invention.

Having described my invention, what I desire to secure by Letters Patent is:

1. A member selected from the group consisting of compounds of the formula

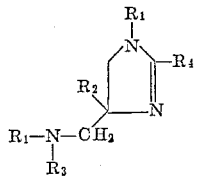

wherein $R_1$ is alkyl of 1 to 18 carbon atoms, $R_2$ is a member selected from the group consisting of hydrogen and lower alkyl, $R_3$ is a member selected from the group consisting of hydrogen and lower alkyl and $R_4$ is a member selected from the group consisting of:

(a) alkyl of 1 to 20 carbon atoms;
(b) cycloalkyl of 5 to 10 carbon atoms containing 5 to 7 carbon atoms in the cycloalkyl ring;
(c) alkyl of 1 to 20 carbon atoms substituted with a member selected from the group consisting of lower alkoxy and phenoxy;
(d) amino;
(e) a member selected from the group consisting of

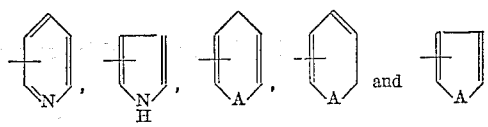

in which A is a member of the group consisting of oxygen and sulfur;
(f) biphenylyl;
(g) diphenylmethyl;
(h) a member selected from those having the formula

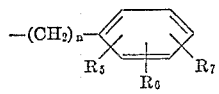

in which $n$ is 0 to 2 and $R_5$, $R_6$ and $R_7$ are members selected from the group consisting of hydrogen, halogen, hydroxyl, lower alkyl, lower alkoxy and nitro; and
(i) a member selected from those having the formula

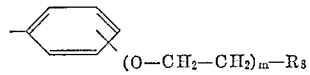

in which $m$ is 1 to 4 and $R_8$ is lower alkoxy;

and the pharmaceutically acceptable non-toxic acid addition salts thereof.

2. 1-(2-ethylhexyl) - 4 - [(2-ethylhexyl)aminomethyl]-2,4-dimethyl-2-imidazoline.
3. 1-(2-ethylhexyl) - 4-{[(2-ethylhexyl)methylamino]methyl}-2,4-dimethyl-2-imidazoline.
4. 1-(2-ethylhexyl) - 4 - [(2-ethylhexyl)aminomethyl]-4-methyl-2-tridecyl-2-imidazoline.
5. 1-(2-ethylhexyl) - 4 - [(2-ethylhexyl)aminomethyl]-4-methyl-2-(3-phenoxypropyl)-2-imidazoline.
6. 2-amino-1-(2-ethylhexyl) - 4-[(2-ethylhexyl)aminomethyl]-4-methyl-2-imidazoline.
7. 1-(2-ethylhexyl) - 4 - [(2-ethylhexyl)aminomethyl]-4-methyl-2-(4-pyridyl)-2-imidazoline.
8. 1-(2-ethylhexyl) - 4 - [(2-ethylhexyl)aminomethyl]-4-methyl-2-(2-furyl)-2-imidazoline.
9. 1-(2-ethylhexyl) - 4 - [(2-ethylhexyl)aminomethyl]-4-methyl-2-phenyl-2-imidazoline.
10. 1-(2-ethylhexyl) - 4-[(2-ethylhexyl)aminomethyl]-4-methyl-2-(p-tolyl)-2-imidazoline.
11. 1-(sec - butyl) - 4 - [(sec-butyl)aminomethyl] - 4-methyl-2-(p-tolyl)-2-imidazoline.
12. 1 - (2 - ethylhexyl) - 4 - {[(2 - ethylhexyl)methylamino]methyl}-4-methyl-2-(p-tolyl)-2-imidazoline.
13. 1-(2-ethylhexyl) - 4-[(2-ethylhexyl)aminomethyl]-4-methyl-2-(m-tolyl)-2-imidazoline.
14. 1-(2-ethylhexyl) - 4-[(2-ethylhexyl)aminomethyl]-4-methyl-2-(p-chlorophenyl)-2-imidazoline.
15. 1-(2-ethylhexyl) - 4-[(2-ethylhexyl)aminomethyl]-4-methyl-2-(3,4-dimethoxyphenyl)-2-imidazoline.
16. 1-(2-ethylhexyl) - 4-[(2-ethylhexyl)aminomethyl]-4-methyl-2-benzyl-2-imidazoline.
17. 1-(2-ethylhexyl) - 4-[(2-ethylhexyl)aminomethyl]-4-methyl-2-(p-bromobenzyl)-2-imidazoline.
18. 1-(2-ethylhexyl) - 4-[(2-ethylhexyl)aminomethyl]-4-methyl-2-(p-methoxybenzyl)-2-imidazoline.
19. 1-(2-ethylhexyl) - 4-[(2-ethylhexyl)aminomethyl]-4-methyl-2-(3,4-dimethoxybenzyl)-2-imidazoline.
20. 1-(2-ethylhexyl) - 4-[(2-ethylhexyl)aminomethyl]-4-methyl-2-(p-hydroxyphenyl)-2-imidazoline.
21. 1-(2-ethylhexyl) - 4-[(2-ethylhexyl)aminomethyl]-4-methyl-2-(p-methoxyphenyl)-2-imidazoline.
22. 1-(2-ethylhexyl) - 4-[(2-ethylhexyl)aminomethyl]-4-methyl-2-(p-hexyloxyphenyl)-2-imidazoline.
23. 1-(2-ethylhexyl) - 4-[(2-ethylhexyl)aminomethyl]-4-methyl-2-(p-bromophenyl)-2-imidazoline.
24. 1-(2-ethylhexyl) - 4-[(2-ethylhexyl)aminomethyl]-4-methyl-2-(p-fluorophenyl)-2-imidazoline.
25. 1-(2-ethylhexyl) - 4-[(2-ethylhexyl)aminomethyl]-4-methyl-2-(3,4-dichlorophenyl)-2-imidazoline.
26. 1-(2-ethylhexyl) - 4-[(2-ethylhexyl)aminomethyl]-4-methyl-2-[p-(methoxytriethoxy)phenyl]-2-imidazoline.
27. 1-(2-ethylhexyl) - 4-[(2-ethylhexyl)aminomethyl]-4-methyl-2-(p-biphenylyl)-2-imidazoline.
28. 1-(2-ethylhexyl) - 4-[(2-ethylhexyl)aminomethyl]-4-methyl-2-diphenylmethyl-2-imidazoline.
29. 1-(2-ethylhexyl) - 4-[(2-ethylhexyl)aminomethyl]-4-methyl-2-(p-nitrobenzyl)-2-imidazoline.
30. 1-(2-ethylhexyl) - 4-[(2-ethylhexyl)aminomethyl]-4-methyl-2-phenethyl-2-imidazoline.

No references cited.

UNITED STATES PATENT OFFICE
CERTIFICATE OF CORRECTION

Patent No. 3,147,270                  September 1, 1964

Floyd E. Anderson

It is hereby certified that error appears in the above numbered patent requiring correction and that the said Letters Patent should read as corrected below.

Column 1, lines 10 to 18, the formula should appear as shown below instead of as in the patent:

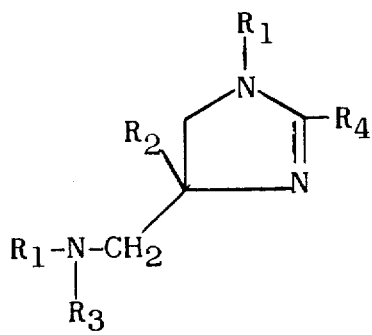

Signed and sealed this 5th day of January 1965.

(SEAL)
Attest:

ERNEST W. SWIDER                  EDWARD J. BRENNER
Attesting Officer                Commissioner of Patents